United States Patent
Perkinson

(10) Patent No.: US 9,973,058 B2
(45) Date of Patent: May 15, 2018

(54) PROPELLER IN-HUB POWER GENERATION AND CONTROL

(71) Applicant: Hamilton Sundstrand Corporation, Windsor Locks, CT (US)

(72) Inventor: Robert H Perkinson, Stonington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 351 days.

(21) Appl. No.: 14/338,799

(22) Filed: Jul. 23, 2014

(65) Prior Publication Data
US 2016/0233740 A1 Aug. 11, 2016

(51) Int. Cl.
| | |
|---|---|
| H02K 7/18 | (2006.01) |
| B64C 11/06 | (2006.01) |
| B64C 11/44 | (2006.01) |
| B64D 15/12 | (2006.01) |
| H02K 13/00 | (2006.01) |

(52) U.S. Cl.
CPC .......... *H02K 7/1823* (2013.01); *B64C 11/06* (2013.01); *B64C 11/44* (2013.01); *B64D 15/12* (2013.01); *H02K 13/003* (2013.01)

(58) Field of Classification Search
CPC .... B60K 6/26; B60K 2006/262; F02N 15/046
USPC .......... 290/49, 43, 44, 55, 54; 310/113, 114, 310/115; 416/1, 44, 60, 65
See application file for complete search history.

(56) References Cited

U.S. PATENT DOCUMENTS

| | | | |
|---|---|---|---|
| 1,828,348 A | 10/1929 | Turnbull | |
| 2,429,061 A * | 10/1947 | Hunter | B64D 15/12 244/134 D |
| 2,488,392 A | 11/1949 | Forsyth | |
| 2,612,228 A | 9/1952 | Forsyth | |
| 3,370,652 A | 2/1968 | Stranks | |
| 3,900,274 A | 8/1975 | Johnston et al. | |
| 4,101,181 A * | 7/1978 | Nakanishi | F16C 25/02 384/129 |
| 4,556,366 A | 12/1985 | Sargisson et al. | |
| 5,122,036 A | 6/1992 | Dickes et al. | |
| (Continued) | | | |

FOREIGN PATENT DOCUMENTS

| | | |
|---|---|---|
| EP | 2562085 A2 | 2/2013 |
| EP | 2727840 A2 | 5/2014 |
| (Continued) | | |

OTHER PUBLICATIONS

Extended European Search Report, European Application No. 15177645.7, dated Jan. 4, 2016, 9 pages.

*Primary Examiner* — Tulsidas C Patel
*Assistant Examiner* — Charles Reid, Jr.
(74) *Attorney, Agent, or Firm* — Kinney & Lange, P.A.

(57) ABSTRACT

A power generation unit for generating electric power within a rotating reference frame includes a generator and a gear assembly. The generator has a plurality of first generator parts disposed concentrically with and radially outward from a plurality of second generator parts. The gear assembly is rotatably attached to the second generator parts and configured to allow relative rotation between the first and second generator parts caused by a single rotating component. The generator and the gear assembly are axially disposed along a common rotational axis.

13 Claims, 2 Drawing Sheets

(56) References Cited

U.S. PATENT DOCUMENTS

| | | | |
|---|---|---|---|
| 5,205,712 A | 4/1993 | Hamilton | |
| 5,281,094 A | 1/1994 | McCarty et al. | |
| 5,704,567 A * | 1/1998 | Maglieri | B64D 15/12 244/134 D |
| 5,709,532 A * | 1/1998 | Giamati | B64D 15/12 219/483 |
| 5,897,293 A | 4/1999 | Arel et al. | |
| 6,137,082 A * | 10/2000 | Pruden | B64D 15/12 219/201 |
| 6,753,513 B2 * | 6/2004 | Goldberg | H05B 1/0236 219/201 |
| 6,811,376 B2 | 11/2004 | Arel et al. | |
| 6,851,929 B2 | 2/2005 | Goldberg | |
| 6,906,537 B2 * | 6/2005 | Goldberg | G01K 1/026 219/490 |
| 7,172,391 B2 | 2/2007 | Carvalho | |
| 8,008,822 B2 | 8/2011 | Hopewell et al. | |
| 8,162,611 B2 | 4/2012 | Perkinson et al. | |
| 8,172,530 B2 | 5/2012 | Perkinson | |
| 8,522,522 B2 * | 9/2013 | Poisson | F01D 15/10 60/39.093 |
| 2010/0013348 A1 * | 1/2010 | Carvalho | H01R 39/08 310/232 |
| 2010/0236849 A1 * | 9/2010 | Wishart | B60K 7/0007 180/65.51 |
| 2011/0024567 A1 * | 2/2011 | Blackwelder | B64D 15/12 244/134 D |
| 2011/0025157 A1 * | 2/2011 | Blackwelder | H02K 7/1807 310/115 |
| 2012/0171017 A1 * | 7/2012 | Norem | F02C 7/277 415/122.1 |
| 2013/0039759 A1 * | 2/2013 | Perkinson | B64C 11/306 416/1 |

FOREIGN PATENT DOCUMENTS

| | | |
|---|---|---|
| GB | 584563 | 1/1947 |
| WO | WO03078248 A1 | 9/2003 |

* cited by examiner

PROPELLER IN-HUB POWER GENERATION AND CONTROL

BACKGROUND

The present invention relates generally to electric generators, and more particularly to an electric generator assembly contained within a propeller system for a turbo-prop engine.

Turbo-prop engines are known within the aircraft industry and function by ingesting air into a compressor section, which includes alternating sections of rotating blades and stationary vanes. Each blade and vane combination is called a compressor stage, within which the air is successively compressed prior to entering the combustion section. The combustor section injects fuel and ignites the air-fuel mixture. The resulting combustion process produces exhaust gases composed of hot air and combustion products that are expelled and expanded through high pressure and power turbines. The first stage turbine shares a common shaft with the rotating blades within the compressor and provides the motive power to the compressor by extracting energy from the exhaust gases. Similarly, the power turbine drives the propeller assembly through a reduction gearbox by further extracting energy from the exhaust gases, which are expelled from the gas turbine through an exhaust nozzle. The reduction gearbox functions to reduce the shaft speed of the power turbine, producing relatively low-speed, high-torque shaft output for driving the propeller assembly. The propeller assembly includes an arrangement of blades affixed to a rotating hub used to propel an aircraft. The speed of the aircraft is determined by the torque imposed on the power turbine by the exhaust gas and by the load imposed by the propeller. The torque delivered to the power turbine is adjustable by controlling the fuel delivered to the combustion section whereas the load imposed by the propeller is controllable by adjusting the pitch of the propeller blades.

There are several known methods of adjusting the pitch of the propeller blades. One such method involves an electric actuator which attaches to each propeller blade and rotates with the propeller assembly within the rotating hub. Electric power can be provided to the motor from a generator located on the stationary side of the turbo-prop engine and transferred to the rotating propeller assembly through slip ring and brush assemblies known in the aircraft industry. Alternatively, the generator can be located within the hub, power generation resulting from the relative movement of a winding and magnet. With this arrangement, typically, the winding is attached to the exterior of the propeller hub and the magnet is attached to the exterior of the reduction gearbox.

Whether electric power is generated in the stationary or the rotating frame of reference, both techniques have disadvantages. For example, the brushes and slip-rings are subject to wear and require more frequent maintenance than non-contact methods. Moreover, driving the magnet portion of the generator at the rotational speed of the hub relative to the gearbox typically requires very large magnets and windings to provide the power to actuate the blades.

Additionally, electric power can be required for other aircraft functions such as restarting an engine during flight and providing emergency electric power during an engine failure. Restarting an engine requires a large battery system or an auxiliary power unit (APU) to spin the compressor and turbine stages to a speed where combustion can occur and be sustained. Emergency electric power is typically provided through a ram air turbine system or RAT that extends from the aircraft to power a generator. Each system adds weight and complexity to the aircraft.

Reducing the weight and improving the reliability of aircraft continues to be a goal of aircraft manufacturers. Therefore, a need exists to provide a consolidated, reliable electric generator system that can fulfill multiple aircraft functions.

SUMMARY

A power generation unit for generating electric power within a rotating reference frame has a generator and a gear assembly. The generation has a plurality of first and second generator parts. The first generator parts are disposed concentrically with and radially outward from the second generator parts. The gear assembly is rotatably attached to the second generator parts and is configured to allow relative rotation between the first and second generator parts caused by a single rotating component. The generator and the gearing assembly are axially disposed along a common rotational axis.

A method of generating electric power within a propeller hub includes providing a propeller hub configured to rotate about an axis, providing a generator, and providing a gearing assembly, the generator and the gearing assembly being concentrically enclosed within the propeller hub. The generator has a plurality of first and second generator parts, the plurality of first generator parts being connected to the propeller hub. The gearing assembly is rotatably attached to the plurality of second generator parts and is configured to allow relative rotation between the first and second generator parts caused by the propeller hub. The method further includes generating electric power by rotating the propeller hub about the axis such that the first generator parts rotate relative to the plurality of second generator parts.

DETAILED DESCRIPTION

Figure 1:
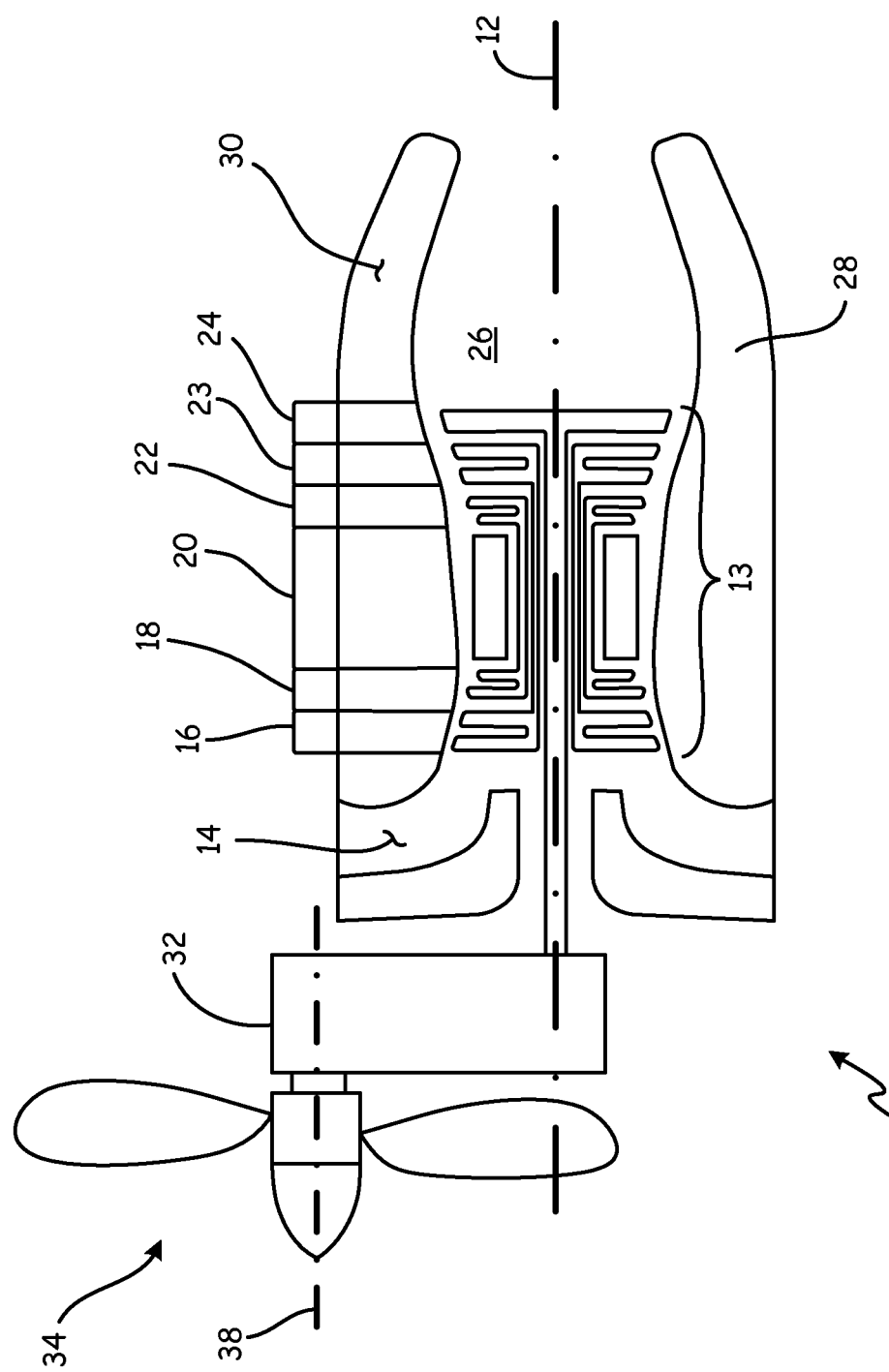
FIG. 1 is schematic view of a turbo-prop engine including a propeller system.

FIG. 1 is a schematic view of turbo-prop engine 10 that has principle and rotational axis 12 and rotational axis 38 of propeller system 34 that is offset from rotational axis 12. Turbo-prop engine 10 includes core engine 13 having, in axial flow series, air intake 14, low-pressure compressor 16 (LPC), high-pressure compressor 18 (HPC), combustion equipment 20, high-pressure turbine 22 (HPT), intermediate-pressure turbine (IPT) 23, free power turbine 24 (LPT), and core exhaust nozzle 26. Housing 28 generally surrounds core engine 13 and defines air intake 14, nozzle 26, and core exhaust duct 30. Turbo-prop engine 10 also includes reduction gear box 32 and propeller system 34. Reduction gear box 32 is attached to and driven by free power turbine 24, reducing shaft speed and increasing torque from free power turbine 24 to drive propeller system 34 with propeller shaft 36.

Turbo-prop engine 10 works in a conventional manner such that air entering air intake 14 is accelerated and compressed by LPC 16 and directed into HPC 18 where further compression takes place. The compressed air exhausted from HPC 18 is directed into combustion equipment 20 where it is mixed with fuel and the mixture combusted. The resultant hot combustion products then expand through, and thereby drive high-pressure, intermediate-pressure, and free power turbines 22, 23, and 24, respectively, before being exhausted through nozzle 26. High-pressure and intermediate-pressure turbines 22 and 23, respectively, drive the compressor stages 16 and 18 by suitable interconnecting shafts. Free power turbine 24 drives propeller system 34. Propeller system 34 provides propulsive thrust to be used by an aircraft.

Figure 2:
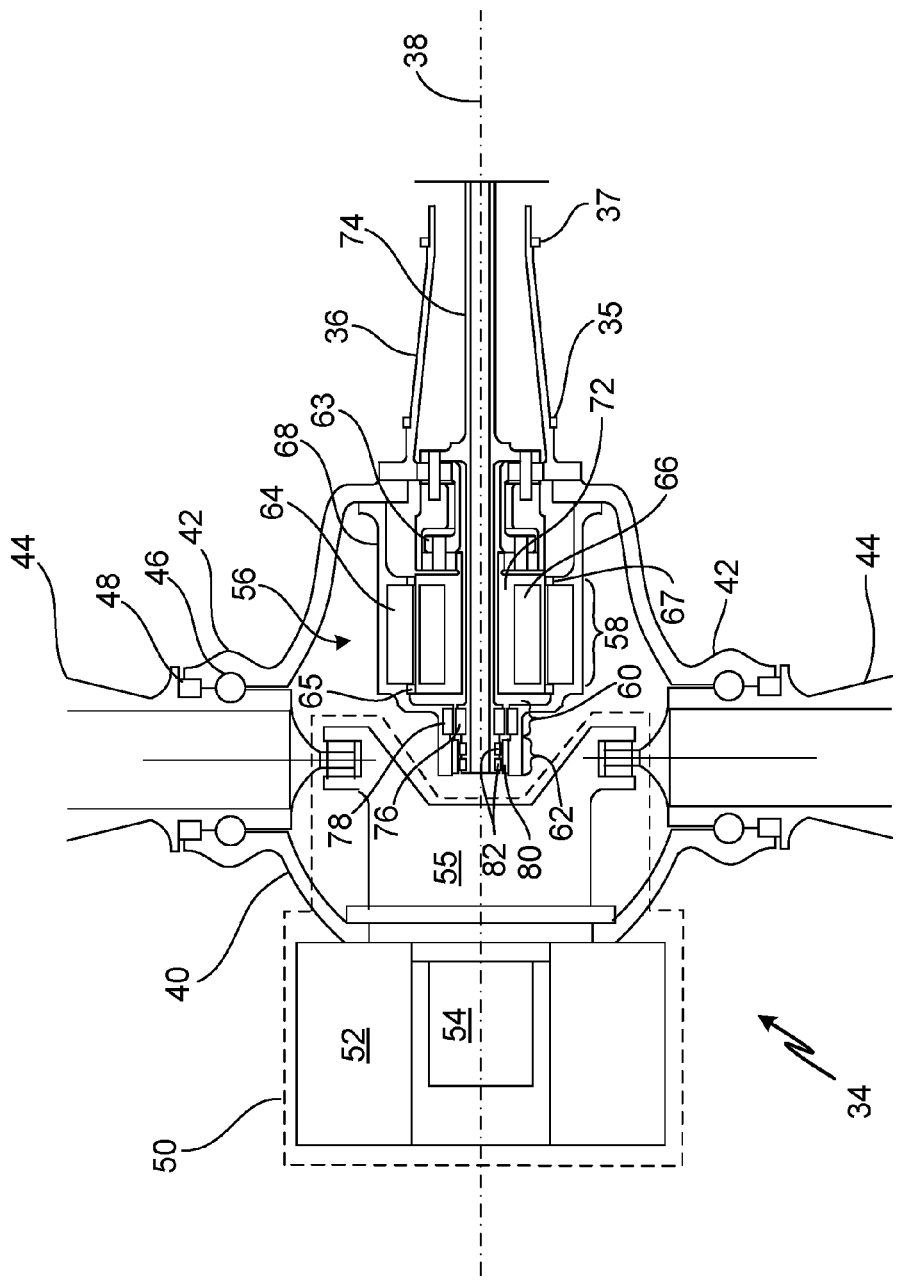
FIG. 2 is a cross-sectional view of the propeller system of FIG. 1 that includes an in-hub power generation unit.

FIG. 2 is a cross-section view of propeller system 34 that has rotational axis 38 that is offset from principle and rotational axis 12 (not shown in FIG. 2). Propeller system 34 includes propeller shaft 36 that is driven by LPT 24 (not shown in FIG. 2) through reduction gear box 32 (not shown in FIG. 2). Propeller hub 40 is attached to and driven by propeller shaft 36 which includes two or more blade attachments 42 that house propeller blades 44. Propeller system 34 is radially supported by bearings 35 and 37. When propeller system 34 operates, propeller blades 44 rotate about rotational axis 38. The rotation of propeller system 34 imposes centrifugal forces on propeller blades 44 that are retained by bearing 46 housed within blade attachments 42. Seal 48 retains lubricating fluids within blade attachment 42.

Propeller system 34 also includes actuation system 50 having rotating electric propeller controller 52, pitch change motor 54, and actuator 55 that are concentrically attached to and rotate with propeller hub 40. Electric propeller controller 52 receives command signals from a source located exterior to propeller hub 40 and causes actuator 55 to change the pitch of propeller blades 44 that are driven by motor 54.

Electric power required by actuation system 50 is generated by in-hub power generation unit 56 that is a component of propeller system 34 and enclosed within propeller hub 40. Power generation unit 56 includes generator 58, inductive coupling 60, auxiliary power connection 62, and gearing 63, each concentrically installed inside propeller hub 40. Power generation unit 56 produces electric power with generator 58 that is electrically connected to actuation system 50, provides a communication link between the rotational and stationary reference frames through inductive coupling 60, and supplies or receives emergency electric power through auxiliary power connection 62. Generator 58 includes first and second generator parts 64 and 66, respectively, and generator hub 68. Gearing 63 allows first and second generator parts 64 and 66 to rotate at different speeds relative to each other while being attached to a single rotating source, in some embodiments, propeller hub 40.

Generally, first generator parts 64 include electric coils, which are arranged around the periphery of generator hub 68 that is attached to and rotates with propeller hub 40. Second generator parts 66 include magnets arranged around and attached to the periphery of rotor 72. First generator parts 64 are radially outward of second generator parts 66. Preferably, second generator parts 66 include permanent magnets; however it will be appreciated that other magnets could be used, for instance an electromagnet. Rotor 72 is attached to and rotates with gearing 63 which can be configured to cause first and second generator parts 64 and 66 to counter rotate. Rotor 72 can be supported by bearings 65 and 67 which are disposed between rotor 72 and generator hub 68. Generally, gearing 63 is also attached to a stationary structure to react forces generated by power generation unit 56. In this embodiment, stationary shaft 74 extends from a stationary portion of reduction gearbox 32, for instance the housing of reduction gearbox 32, and is arranged concentrically with rotational axis 38 of propeller system 34. Alternatively, gearing 63 can be configured to multiply the rotational speed of propeller hub 40 such that second generator parts 66 have a rotational speed different from first generator parts 64.

Preferably, gearing 63 multiplies the rotational speed of propeller hub 40 and causes first and second generator parts 64 and 66 to counter rotate. Such a configuration creates the maximum relative rotational speed between first and second generators parts 64 and 66, thereby reducing the relative component size of power generation unit 56 and allowing power unit 56 to generate electric power in a compact package. In some embodiments, the relative rotational speed between first and second generator parts 64 and 66 is between approximately 20,000 rpm and 30,000 rpm. The number of first and second generator parts 64 and 66 are determined through generator design techniques known in the art.

Inductive coupling 60 includes stationary winding 76 and rotatable winding 78. Winding 76 is attached to stationary shaft 74, which further extends through gearing 63 and generator 58. Winding 78 is attached to generator hub 68, which rotates with propeller hub 40. Inductive coupling 60 communicates signals between the rotational and stationary reference frames. For example, to transmit a signal from the stationary to the rotating reference frame, an electric current or signal current is supplied to winding 76 through cables (not shown) inside stationary shaft 74 which can have a cylindrical shape to accommodate such cabling. The signal current within winding 76 generates a magnetic field that interacts with winding 78 to create a signal voltage therebetween. Since inductive coupling 60 is electrically connected to rotating electric propeller controller 52, controller 52 can be programmed to perform a function that corresponds to the signal voltage from winding 78. The signal current can be varied in several ways for the purpose of transmitting commands to propeller controller 52. For example, the signal current can have a variable frequency or voltage, the changes in frequency or voltage causing corresponding changes in the signal voltage in winding 78. As before, propeller controller 52 can be programmed to perform a command corresponding to frequency or voltage changes from the signal current.

Auxiliary power connection 62 includes at least one slip ring 80 that is rotably attached to generator hub 68 and two or more electrical brushes 82 that are attached to stationary shaft 74. Auxiliary power connection 62 receives or transits electrical power through cabling (not shown) that is routed through the center of stationary shaft 74. If multiple electrical circuits are required, additional slip-ring and brushes combinations can be added to auxiliary power connection 62.

Auxiliary power connection 62 can function as a backup system in the event of a failure of power unit 56 by supplying electric power into propeller system 34. In this instance, electric power can be supplied through cabling (not shown in FIG. 2) routed through stationary shaft 74 to brushes 82. At least one slip-ring 80 can receive the electric power from brushes 82 and transmit the power to actuation system 50 where it can be used to change the pitch of propellers 44.

Locating power generation unit 56 within propeller hub 40 has several advantages over other power generation systems known in the art. Principally, power generation unit 56 produces electric power so long as propeller system 34 rotates, because relative rotation of first generator parts 64 and second generator parts 66 connected through gearing 63 can be achieved with a single rotational source, in some embodiments, propeller hub 40. Such an arrangement allows power generation unit 56 to be designed to generate sufficient electric power when propeller system 34 is windmilling in addition to when it is operating normally. In this context "windmilling" refers to the rotation of propeller system 34 caused by the flow of air through propeller blades 44 when turbo-prop engine 10 is not operating. "Operating normally" refers to the condition when propeller system 34 is driven by the output of turbo-prop engine 10 transmitted through reduction gearbox 32. Because power generation unit 56 can be so designed, it can be used for other aircraft functions in addition to powering actuation system 50, for instance restarting turbo-prop engine 10 during flight or providing power during an engine failure normally provided by a ram air turbine (RAT) system.

Restarting turbo-prop engine 10 during flight requires a power source to drive HPT 22 and IPT 23 to a minimum rotational speed necessary for HPC 18 and LPC 16 to generate pressure and flow conditions necessary to sustain combustion within combustion equipment 20. There are several engine restarting methods known in the art, each requiring additional systems to execute. For example, one method involves an auxiliary battery system used to power starting motors that drive HPT 22 and IPT 23 to generate starting rotor speed. Another method utilizes a small gas turbine engine or auxiliary power unit (APU) installed on the aircraft to generate electric power to power starting motors to achieve starting rotor speed. Alternatively, compressed air bled from a second turbo-prop engine or APU could be used to drive HPT 22 and IPT 23 to starting rotational speed. Once sustained combustion is achieved, the exhaust gases expanding through HPT 22 and IPT 23 further expand through LPT 24 driving propeller system 34 through reduction gearbox 32. Each method relies on other systems or engines to restart the engine.

The present invention allows turbo-prop engine 10 to be self-restarting, thereby eliminating bulking auxiliary systems or reliance on a second engine or APU. Electric power for restarting turbo-prop engine 10 can be provided by power generation unit 56 when propeller system 34 is windmilling because the relative rotation of first and second generator parts 64 and 66 is produced from a single rotating source, in some embodiments, propeller hub 40. The electric power produced while propeller system 34 is windmilling can be used to drive an electric motor, the electric motor causing HPT 22 and IPT 23 to accelerate to speeds necessary to sustain combustion within combustion equipment 20. Once combustion is sustained, the exhaust gases expand through and further accelerate HPT 22, IPT 23, and LPT 24 to normal operating conditions.

RAT systems provide emergency power to aircraft during an engine failure or other electrical failure. RAT systems function by automatically extending a small turbine from the aircraft during an engine failure. The turbine drives a generator that provides electric power to critical aircraft systems.

In a manner similar to restarting turbo-prop engine 10, the present invention can function as a RAT system. During an electrical failure where no power is available to the airframe, electric power from power generation unit 56 or from auxiliary power connection 62 can power actuation system 50 to position propeller blades 44 for RAT operation. Once propeller blades 44 are properly positioned, propeller system 34 rotates about axis 38. Generator hub 68 and propeller hub 40 rotate driving first generator parts 64 and second generator parts 66 through gearing 63. The relative rotation of first and second generator parts 64 and 66 produces electric power. In this configuration, power generation unit 56 can supply electric power to critical aircraft systems during situations when turbo-prop engine 10 cannot be restarted.

The present invention can also supply electric power for a de-icing system housed on or within propeller blades 44. During operation, ice may form on propeller blades 44 and alter the aerodynamic characteristics of each blade 44. Ice formation on propeller blades 44 may also affect the propulsion characteristics of propeller system 34. Commonly, a de-icing system is incorporated into propeller blades 44 to maintain the aerodynamic characteristics of propeller blades 44 and such designs are known in the art. Generally, de-icing systems use electric power to function. Such power can be supplied by power generation unit 56.

Another advantage of the present invention is that power generation unit 56 can be arranged in a self-contained subassembly for easing installation and removal for maintenance. In one embodiment, a power unit subassembly can include generator 58, inductive coupling 60, auxiliary power connection 62, gearing 63, generator hub 68, and stationary shaft 74. In another embodiment, a power unit subassembly can include generator hub 68 and generator-hub-mounted components including first generator parts 64, winding 78 of inductive coupling 60, and slip-ring 80 of auxiliary power connection 62. In another embodiment, a power unit subassembly can include stationary shaft 74 and stationary-shaft-mounted components including winding 76 of inductive coupling 60 and brushes 82 of auxiliary power connection 62. In another embodiment, a power unit subassembly can include rotor 72 and second generator parts 66. In another embodiment, a power unit subassembly can include rotor 72, second generator parts 66, and gearing 63. In another embodiment, a power unit subassembly can include stationary shaft 74, winding 76 of inductive coupling 60, brushes 82 of auxiliary power connection 62, gearing 63, rotor 72, and second generator parts 66. Moreover, it will be appreciated by persons skilled in the art that other power unit subassemblies may be advantageous depending upon the installation and maintenance requirements of a particular application.

The invention also provides a more reliable electrical connection through auxiliary power connection 62. Prior art brush and slip ring assemblies that are incorporated into propeller systems have larger diameter brushes and slip rings, and consequently higher contact speeds, because each is incorporated into the propeller system near the periphery of a propeller hub or shaft. Moreover, prior art brush and slip ring assemblies are exposed to exterior contaminants. By protecting brushes 82 and slip-ring 80 within propeller hub 40, the contact speed between components and the exposure to exterior contaminants is reduced, causing a corresponding increase in service life and reliability relative to prior art brush and slip ring assemblies.

Discussion of Embodiments

The following are non-exclusive descriptions of possible embodiments of the present invention.

A power generation unit for generating electric power within a rotating reference frame can include a generator and a gear assembly. The generator can include a plurality of first and second generator parts, the plurality of first generator parts being disposed concentrically with and radially outward from the plurality of second generator parts. The gear assembly can be rotatably attached to the second generator parts and can be configured to allow relative rotation between the first and second generator parts caused by a single rotating component. The generator and the gear assembly can be axially disposed along a common rotational axis.

A further embodiment of the foregoing power generator unit can optionally include, additionally and/or alternatively, any one or more of the following features, configurations, and/or additional components:

A further embodiment of the foregoing power generator unit can include an inductive coupling and an auxiliary power connection. The inductive coupling can include a first winding and a second winding. The second winding of the inductive coupling can be rotatable with respect to the first windings of the inductive coupling. The auxiliary power connection can include a slip ring and a plurality of brushes. The slip ring can be rotatable with respect to the plurality of brushes. The auxiliary power connection can be configured to transmit electric current from the plurality of brushes to the slip ring. The generator, the inductive coupling, the auxiliary power connection, and the gear assembly can be axially disposed along the common rotational axis.

A further embodiment of any of the foregoing power generation units can have a plurality of first generator parts disposed around the periphery of a generator hub. The generator hub can be rotatably connected the single rotating component.

A further embodiment of any of the foregoing power generation units can include an input of the gear assembly that can be rotatably attached to the single rotating component and an output of the gear assembly that can be rotatably attached to the second generator parts.

A further embodiment of any of the foregoing power generation units can include first generator parts that can be electrical windings and second generator parts that can be permanent magnets.

A further embodiment of any of the foregoing power generation units can include a plurality of first generator parts that can rotate in a direction opposite from the plurality of second generator parts.

A further embodiment of any of the foregoing power generation units can include a plurality of second generator parts that can rotate at a speed higher than a speed of the plurality of first generator parts.

A further embodiment of any of the foregoing power generation units can include an auxiliary power connection that can be configured to transmit electric current from the slip ring to the plurality of brushes.

A further embodiment of any of the foregoing power generation units can have a propeller hub as the single rotating component. The propeller hub can be concentrically disposed to and enclose the generator, the inductive coupling, and the auxiliary power connection. The propeller hub can rotate about the common axis.

A further embodiment of any of the foregoing power generation units can include a stationary shaft that is rotatably restrained. The first winding of the inductive coupling and the plurality of brushes of the auxiliary power connection can be attached to the stationary shaft. The second winding of the inductive coupling and the slip ring of the auxiliary power connection can be attached to the propeller hub.

A further embodiment of any of the foregoing power generation units can have the stationary shaft concentric with the common rotational axis and can extend through the gear assembly and the generator.

A method of generating electric power within a propeller hub can include providing a propeller hub that is configured to rotate about an axis, providing a generator concentrically enclosed within the propeller hub, and providing a gear assembly concentrically enclosed within the propeller hub. The generator can include a plurality of first and second generator parts. The plurality of first generator parts can be connected to the propeller hub. The gear assembly can be rotatably attached to the plurality of second generator parts. The gear assembly can be configured to allow relative rotation between the plurality of first and second generator parts caused by the propeller hub. The method can further include generating electric power by rotating the propeller hub about the axis such that the plurality of first generator parts rotate relative to the plurality of second generator parts.

A further embodiment of the foregoing method can optionally include, additionally and/or alternatively, any one or more of the following features, configurations, and/or additional components:

A further embodiment of the foregoing method can further include providing an inductive coupling, providing a control unit attached to the propeller hub that governs the pitch of a plurality of propeller blades, providing a motor, providing an actuator driven by the motor configured to change the pitch of the plurality of propeller blades, supplying electric power from the generator to the motor, and transmitting control signals through the inductive coupling to the control unit.

A further embodiment of any of the foregoing methods can further include providing a device configured to de-ice a plurality of propeller blades and supplying electric power from the generator to the device.

A further embodiment of any of the foregoing methods can further include providing an auxiliary power connection comprising a slip ring and a plurality of brushes and supplying electric power from the generator to the slip ring of the auxiliary power connection. The slip ring can be rotatable with respect to the plurality of brushes. the auxiliary power connection can be configured to transmit electric power from the slip ring to the plurality of brushes.

The invention claimed is:

1. A power generation unit for generating electric power within a rotating reference frame, comprising:
    a propeller shaft rotatably driven by a turbo-prop engine;
    a stationary shaft concentric with the propeller shaft and rotatably restrained by the turbo-prop engine;
    a propeller hub coupled to the propeller shaft;
    a generator comprising a plurality of first and second generator parts, wherein the first generator parts are rotatably coupled to the propeller hub such that the first generator parts rotate in the same direction and at the same rotational speed as the propeller hub, and wherein the first generator parts are disposed concentrically with and radially outward from the second generator parts; and
    a gear assembly rotatably coupled to the propeller hub and configured to counter-rotate the first and second generator parts, wherein the gear assembly is driven by the propeller hub and thereby rotates the second generator parts at a rotational speed that is greater than the rotational speed of the propeller hub and in a rotational direction opposite a rotational direction of the first generator parts, and wherein the generator and the gear assembly are axially disposed along a common rotational axis.

2. The power generation unit of claim 1, further comprising:
    an inductive coupling comprising a first winding and a second winding, wherein the second winding is rotatable with respect to the first winding; and
    an auxiliary power connection comprising a slip ring and a plurality of brushes, wherein the slip ring is rotatable with respect to the plurality of brushes, and wherein the auxiliary power connection is configured to transmit electric current between the plurality of brushes and the slip ring, and wherein the generator, the inductive coupling, the auxiliary power connection, and the gear assembly are axially disposed along the common rotational axis.

3. The power generation unit of claim 1, wherein the first generator parts are disposed around a periphery of a generator hub rotatably connected to the propeller hub.

4. The power generation unit of claim 1, wherein the first generator parts are electrical windings and the second generator parts are permanent magnets.

5. The power generation unit of claim 2, wherein the auxiliary power connection is configured to transmit electric current from the slip ring to the plurality of brushes.

6. The power generation unit of claim 2, wherein the propeller hub is concentrically attached to and encloses the generator, the inductive coupling, and the auxiliary power connection, and wherein rotating potions of the propeller hub, the generator, the inductive coupling, and the auxiliary power connection rotate about the common rotational axis.

7. A method of manufacturing a generator assembly for installation within a propeller hub, the method comprising:
providing a propeller hub configured to rotate about an axis;
providing a generator concentrically enclosed within the propeller hub, the generator comprising a plurality of first and second generator parts, wherein the plurality of first generator parts are connected to the propeller hub such that the first generator parts rotate at the same speed and in the same direction as the propeller hub; and
providing a gear assembly concentrically enclosed within the propeller hub and rotatably attached to the second generator parts and the propeller hub, wherein the propeller hub is configured to drive the gear assembly and thereby drive rotation of the plurality of second generator parts in a direction opposite to a rotational direction of the propeller hub and at a greater rotational speed than a rotational speed of the propeller hub.

8. The method of claim 7, the method further comprising:
providing a control unit attached to the propeller hub that governs the pitch of a plurality of propeller blades;
providing an inductive coupling configured to transmit a control signal between a stationary winding of the inductive coupling and a rotatable winding of the inductive coupling and transmit the control signal from the rotatable winding to the control unit;
providing a motor electrically connected to the generator; and
providing an actuator configured to change the pitch of the plurality of propeller blades in response to the signal from the control unit, wherein the motor drives the actuator.

9. The method of claim 7, the method further comprising:
providing a device configured to de-ice a plurality of propeller blades and electrically connected to the generator.

10. The method of claim 7, the method further comprising:
providing an auxiliary power connection comprising a slip ring and a plurality of brushes, wherein the slip ring is rotatable with respect to the plurality of brushes and electrically connected to the generator.

11. The power generation unit of claim 1, wherein the propeller hub rotates in the same direction and at the same speed as the propeller shaft.

12. The method of claim 7, and further comprising:
providing a propeller shaft coupled to the propeller hub and configured to rotate in the same direction and at the same speed as the propeller hub.

13. The method of claim 8, and further comprising:
attaching the control unit to the propeller hub such that the control unit rotates at the same speed and in the same direction as the propeller hub.

* * * * *